United States Patent Office 2,809,927
Patented Oct. 15, 1957

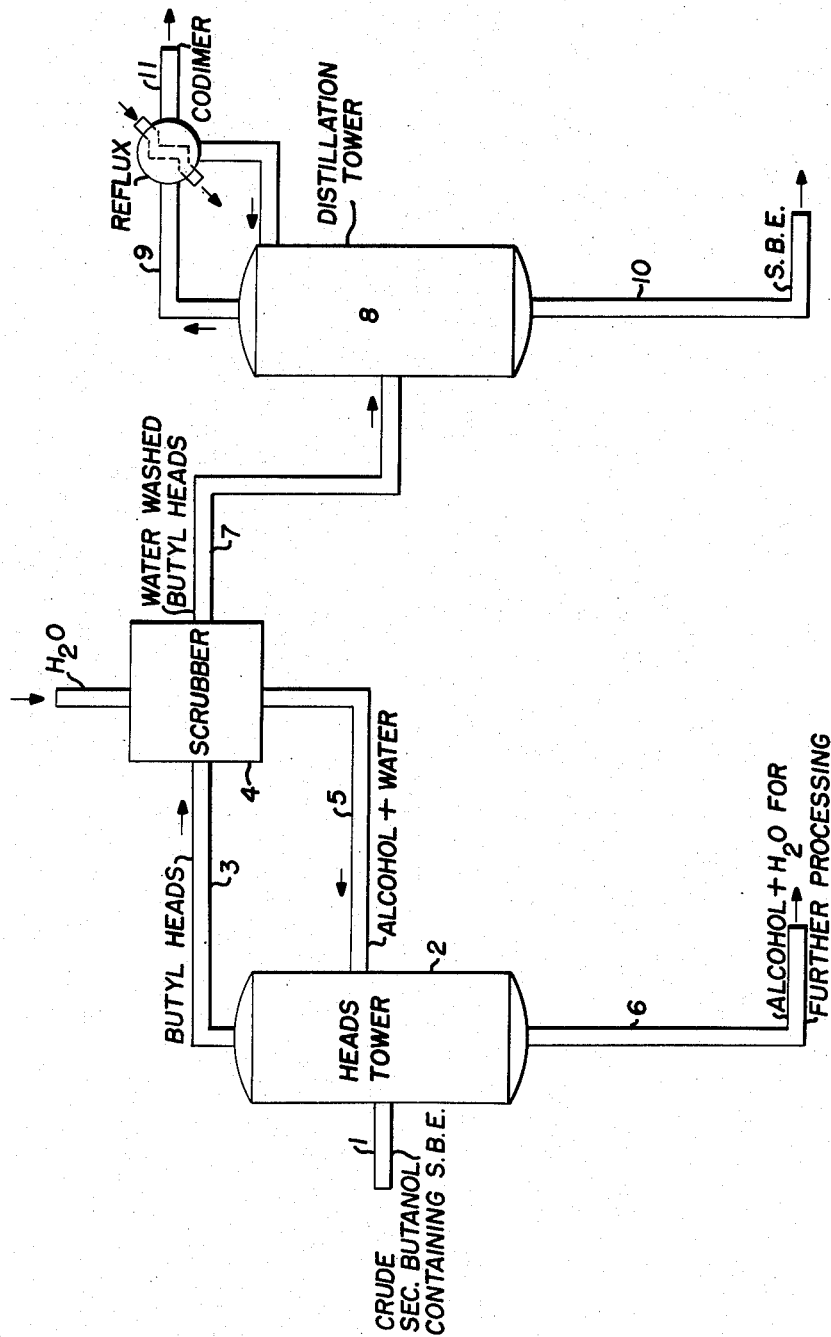

2,809,927

SEPARATION OF SEC-BUTYL ETHER FROM POLYMERIC HYDROCARBONS

John H. Staib, Plainfield, N. J., assignor to Esso Research and Engineering Company, a corporation of Delaware Application October 27, 1955, Serial No. 543,147

3 Claims. (Cl. 202—67)

This invention relates to a novel process for the separation of secondary butyl ether from polymeric hydrocarbons. More particularly, this invention relates to the separation and recovery of secondary butyl ether from water washed butyl heads containing a mixture of polymeric $C_8$ hydrocarbons.

The olefin acid-catalyzed hydration method of preparing secondary butyl alcohol is well known in the art. Crude secondary butyl alcohol may thus be produced by the sulfuric acid catalyzed hydration of butylene-2 by the weak acid method or the strong acid method. In the former process a relatively rich butylene stream from hydrocarbon cracking operations and containing about 50 to 80 vol. percent butylene is absorbed in sulfuric acid of approximately 60 to 80 wt. percent concentration, preferably 70 wt. percent, at about 170° F. and approximately 250 p. s. i. g. pressure to form an acid extract comprising a mixture of secondary butyl sulfates, e. g., mono and di-secondary butyl sulfates, which are partially hydrolyzed to alcohol during the absorption. The hydrolysis is completed by dilution of the extract with water to approximately 45 weight percent acid strength and subsequent heating at a temperature of about 190° F. for a period of about ten minutes. The hydrolysis products are then distilled in an alcohol regenerator wherein crude alcohol vapors are removed overhead and condensed, and wherein spent sulfuric acid is recovered as bottoms for concentration and subsequent use in the olefin absorption process. The crude secondary butyl alcohol will contain impurities including $C_8$ hydrocarbon polymers referred to herein as "codimer," secondary butyl ether, unknown impurities, and water. Thus crude alcohol product is then subjected to a purification process as described below.

In the strong acid process, a butylene stream of relatively lower butylene content, for example about 30 to 60 vol. percent butylene, is contacted under similar conditions with a stronger sulfuric acid, for example, acid of 80 to 95 wt. percent concentration, preferably 85 to 88 wt. percent, whereby an acid extract is formed as above. The extract goes through a similar hydrolysis and stripping treatment to produce a crude secondary butyl alcohol as described for the weak acid process.

When the crude secondary butyl alcohol from either the weak or strong acid process is purified by conventional fractionation, it is first passed to a heads tower, the purpose of which is to remove as overhead secondary butyl ether and other low boiling water-insoluble impurities, such as hydrocarbons, hydrocarbon polymers, oxygenated compounds and unknown impurities.

The table below represents the approximate composition of the crude secondary butyl alcohol referred to herein. It is to be understood that the composition varies considerably depending on the source.

*Crude secondary butyl alcohol to tower heads, weight percent*

|  | Range | Average |
|---|---|---|
| Secondary Butyl Ether | 0.5–3.5 | 2 |
| Secondary Butyl Alcohol | 67–75 | 70 |
| $C_4$ Hydrocarbons | 0–3 | nil |
| $C_8$ Codimer | 0.5–3 | 2 |
| $H_2O$ | 15–22 | 20 |

This is accomplished by feeding the crude aqueous alcohol mixture containing the impurities above described to the heads tower generally at a point below the top, preferably at about the mid-point of the tower.

The butyl heads stream taken overhead from the heads tower will comprise secondary butyl ether together with some secondary butyl alcohol and the aforementioned water-insoluble impurities including codimer. The bottoms stream will contain the bulk of the crude secondary butyl alcohol. The overhead stream is then led to a scrubber wherein the crude secondary butyl ether is water washed to remove the greater part of the alcohol which has been carried overhead with the ether. The alcohol-water mixture from the scrubber is returned to the heads tower where it is recovered in the alcohol bottoms stream which is subsequently purified by any of the methods well known in the art. Operation of the scrubber at elevated temperatures greatly broadens the solubility range of secondary butanol. For example at 107° C. secondary butanol is completely miscible with water.

The composition of the butyl heads which is passed to the water scrubber will also vary; however, the following composition is representative.

*Butyl heads prior to washing*

|  | Wt. percent |
|---|---|
| Secondary butyl ether | 20 |
| Secondary butyl alcohol | 40–50 |
| $C_4$ hydrocarbons | 10–0 |
| $C_8$ codimer | 20 |
| $H_2O$ | 2 |

The water thus supplied to the scrubber is sufficient to permit taking off the top substantially all of the water-insoluble impurities contained in the crude alcohol. The impurities or "water-washed butyl heads" comprise secondary butyl ether, ketone, small amounts of alcohol, light hydrocarbons, e. g., butylenes and higher boiling $C_8$ polymers (codimer).

The mode of producing secondary butyl alcohol as described above is illustrative of a method in which the water-washed butyl heads are recovered.

The separation of secondary butyl ether from the crude water washed butyl heads has heretofore presented a difficult problem since the various $C_8$ polymeric hydrocarbons contained therein form a number of azeotropes with the ether and render difficult any attempt at separating and recovering a relatively pure ether product.

The present invention provides a method of overcoming this difficulty in the separation of secondary butyl ether from the water-washed butyl heads.

It has now been discovered that the several azeotropic mixtures formed in the water-washed butyl heads between the $C_8$ hydrocarbon polymers and the secondary butyl ether can be selectively broken as to recover in good yields and high purity secondary butyl ether, by distillation at superatmospheric pressure. Crude secondary butyl ether contains a complex mixture of polymeric $C_8$ hydrocarbons of variable composition. For example the following components have been identified as the major substances in the codimer: 2,3,4 trimethyl pentene-1, 108° C. B. P.; 2,3,4 trimethyl pentene-2, 116° C. B. P.; 2,3,3 trimethyl pentene-1, 108° C. B. P.; 3,4,4 trimethyl pentene-2, 114° C. B. P. The use of superatmospheric pressure of from 5–40 atmospheres (absolute) in the distillation finishing step permits the separation of secondary butyl ether from the complex polymeric hydrocarbons. Generally it is preferred to carry out the distillation at a pressure of about 10–20 atmospheres. Any butylenes in the feed are easily taken off overhead and present no problem. In fact, if the water-washed butyl heads are first "weathered," that is permitted to stand at room temperature, the butylenes which boil within a range of approximately −7.0° C. to 1.0° C. will be substantially eliminated. Under such conditions it is possible to separate the impurities as an overhead stream and recover a purified ether product from the bottoms.

The temperatures in the distillation tower where the impurities such as the polymeric hydrocarbons are taken off will vary in accordance with the pressures used. The higher temperatures are associated with higher pressures. It has been found that in order to recover a secondary butyl ether cut of high purity from the bottoms, it is necessary to use at least 5 and not more than about 40 atmospheres pressure. Due to possible thermal degradation of the products at high temperatures, it is generally preferred to operate at about 10 to 20 atmospheres pressure when high quality of the final product is deemed important. With the above range of pressure, the temperatures of the bottoms in the still will run from about 220° C. to 350° C. and those of the overhead distillation products from about 170° C. to 300° C. The volume percent cut which is taken as the bottoms stream, which contains the purified secondary butyl ether, will be dependent on the volume percent secondary butyl ether in the feed. To obtain the best yield-purity relationship, the volume percent taken as the bottoms stream preferably should not exceed the volume percent of secondary butyl ether in the feed. Taking a smaller bottoms cut will result in higher purity with less yield. It is preferred to take as a bottom stream cut an amount equal to 95 to 99 volume percent of the secondary butyl ether in the washed butyl heads.

The accompanying drawing illustrates one form of the process for separating secondary butyl ether from water-washed butyl heads commencing with crude secondary butanol obtained by the hydration of a butylene rich stream taken from a debutanizer of a conventional cracking operation.

Referring to the drawing, crude secondary butanol obtained by the olefin acid catalyzed hydration method is led via pipe 1 to a heads tower 2, wherein a distillation step takes place. The "butyl heads" containing the secondary butyl ether, alcohol, codimer and other impurities are taken off overhead via line 3 and passed to a scrubber 4. Water is then admitted into the scrubber at about a ratio of 4 to 1, wherein the secondary butanol which is readily miscible with water is separated as an aqueous extract and returned to the heads tower 2, via line 5.

The crude alcohol-water mixture is taken off as a bottoms stream 6 and led to purification units. The water-washed butyl heads now containing as the major components secondary butyl ether, codimer and butylenes is led via pipe 7 to a distillation unit 8 wherein the mixture is distilled under pressure of 5 to 40 atmospheres, preferably 10–20. The reflux ratio at 9 is set at about 3 to 1 and the complex codimer mixture is recovered overhead via line 11. The secondary butyl ether is taken off as a bottoms stream 10, in an amount preferably less than the amount of ether in the butyl heads.

The composition of the water-washed butyl heads will of course vary considerably, depending upon the manner in which it was obtained and the composition of the original butylene rich stream. However, generally the composition will fall within the ranges set forth below.

*Water washed butyl heads (unweathered)*

| | Percent by weight |
|---|---|
| Secondary butyl ether | 40–60 |
| Butylenes | 15–25 |
| Codimer [1] | 20–40 |
| Secondary butanol | 0.5–2 |
| Water | 0.5–2 |

[1] 2,3,4 trimethyl pentene-1—108° C. B. P.
2,3,4 trimethyl pentene-2—116° C. B. P.
2,3,3 trimethyl pentene-1—108° C. B. P.
3,4,4 trimethyl pentene-2—114° C. B. P.

To illustrate how all of the components of the codimer azeotrope with secondary butyl ether as a smear throughout the boiling range, a batch distillation at atmospheric pressures of water-washed butyl heads was run. A typical partially weathered charge was used and the results are given below.

*Batch distillation*

Column: 1″ x 40 plate at 5/1 reflux ratio.
Charge: 800 cc.

| Cut No. | Cut Volume, cc. | Overhead Composition, Vol. Percent | | | | T.° C. | Remarks |
|---|---|---|---|---|---|---|---|
| | | SBE | HC | H$_2$O | SBuOH | | |
| 1 | 160 | | 100 | | | 71 | C$_4$HO |
| 2 | 50 | 24 | 26 | 34 | 16 | 96 | |
| 3 | 50 | 14 | 80 | 6 | | 112.5 | |
| 4 | 50 | 16 | 84 | | | 116 | |
| 5 | 50 | 28 | 72 | | | 118 | |
| 6 | 50 | 40 | 60 | | | 119 | |
| 7 | 50 | 64 | 36 | | | 120 | |
| 8 | 50 | 76 | 24 | | | 120.5 | |
| 9 | 50 | 96 | 4 | | | 121 | |
| 10 | 50 | 96 | 4 | | | 121 | |
| 11 | 50 | 96 | 4 | | | 121 | |
| 12 | 50 | 96 | 4 | | | 121 | |
| 13 | 20 | 95 | 5 | | | 121 | |
| Btms | 70 | 60 | 40 | | | | |

Cut numbers 1–8 were topped out and the remaining blended cuts were analyzed to show an 87% purity. The yield of secondary butyl ether from cut 9 to the bottoms was 66%.

Continuous distillation of the water-washed butyl heads at superatmospheric pressures is compared to distillation at atmospheric pressures, in the examples given below.

*Continuous distillation of washed butyl heads*

The column used for these runs was a 1″ I. D. x 72″ packed with .16″ x .16″ protruded stainless steel packing equivalent to about 25 theoretical plates. The feeds were weathered to varying degrees.

| Run | Feed, Vol. Percent | | | Press., Atm. | Temp., ° C. | | Reflux Ratio | Vol. Percent recovered | |
|---|---|---|---|---|---|---|---|---|---|
| | S. B. E. | Codimer | Butylenes | | Ohd. | Still | | Ohd. | Btms. |
| 127 | 57.5 | 23.0 | 17.8 | 1 | 94 | 123 | 10/1 | 32.2 | 52.0 |
| 129 | 57.5 | 27.0 | 13.6 | 1 | 94 | 123 | 3/1 | 38.6 | 47.8 |
| 128 | 50.5 | 42.0 | 7.8 | 11 | 183 | 236 | 3/1 | 38.5 | 53.7 |

Product evaluation

| Run | Vol. Percent S. B. E. | | Vol. Percent yield, S. B. E.[2] | Y/P[3] | Vol. Percent Recovery, S. B. E.[4] |
| --- | --- | --- | --- | --- | --- |
| | Ohd. | Btms.[1] | | | |
| 127 | 29.0 | 90.8 | 82.0 | .904 | 98.2 |
| 129 | 36.8 | 89.5 | 74.4 | .84 | 99.1 |
| 128 | 1.4 | 92.5 | 98.5 | 1.06 | 99.5 |

[1] Product purity.
[2] SBE in product stream/SBE in feed.
[3] Yield/purity relationship.
[4] SBE in ohd. (which contains the codimer) + SBE in bottoms stream/SBE in feed.

In run No. 128, the volume percent taken as the bottoms cut was greater than the volume percent of secondary butyl ether in the original feed. This resulted in a product purity considerably less than would be obtained by taking a bottoms cut the same as or less than the volume percent of secondary butyl ether in the feed. Despite this the product purity was greatly improved over the purity of the product recovered from distillation at atmospheric pressures, i. e., 92.5% purity as compared with 87%.

Significantly, commercially acceptable reflux ratios of 3/1 and ratios as low as 1/1 are practical. Using a conventional distillation process, even at a reflux ratio of 10/1 the purity and yield are not sufficiently high for a commercially acceptable product. Although 10/1 and higher reflux ratios may be used in the present process, the added cost would make such reflux ratios economically undesirable.

What is claimed is:

1. A process for separating secondary butyl ether from a mixture containing it in minor amounts, and also containing $C_8$ polymeric hydrocarbons comprising 2,3,4 trimethyl pentene-1, 2,3,4 trimethyl pentene-2, 3,4,4 trimethyl pentene-1, and 3,4,4 trimethyl pentene-2, and a major amount of secondary butyl alcohol, which comprises distilling said mixture to take overhead a composition containing a major amount of secondary butyl alcohol, minor amounts of secondary butyl ether and said $C_8$ hydrocarbons, washing said composition with water at elevated temperatures to remove most of the alcohols therefrom, leaving a water washed composition containing several azeotropic mixtures comprising said $C_8$ polymeric hydrocarbons and secondary butyl ether, distilling the water washed composition at 10–20 atmospheres pressure and recovering as a bottoms product secondary butyl ether of high purity.

2. A method in accordance with claim 1 wherein the water washed composition contains 0.5 to 2 wt. percent secondary butyl alcohol.

3. A method in accordance with claim 1 wherein the pressure employed for the distillation of the water washed composition is about 11 atmospheres.

References Cited in the file of this patent

UNITED STATES PATENTS 2,392,534   Von Kenssler _____ Jan. 8, 1946

OTHER REFERENCES

"Laboratory Fractional Distillation," by T. P. Carney. MacMillan Co., New York, 1949, p. 204.